(12) United States Patent
Airey et al.

(10) Patent No.: US 6,725,553 B2
(45) Date of Patent: Apr. 27, 2004

(54) CONTOUR MEASURING DEVICE AND METHOD

(76) Inventors: Donald R. Airey, 185 Wilder Rd., Bolton, MA (US) 01740; Herman Servatius, 15 Trowbridge Rd., Worcester, MA (US) 01609

( * ) Notice: Subject to any disclaimer, the term of this patent is extended or adjusted under 35 U.S.C. 154(b) by 0 days.

(21) Appl. No.: 09/851,353

(22) Filed: May 9, 2001

(65) Prior Publication Data

US 2002/0124424 A1 Sep. 12, 2002

Related U.S. Application Data

(63) Continuation-in-part of application No. 09/767,410, filed on Jan. 19, 2001, now Pat. No. 6,550,151.

(51) Int. Cl.[7] .............................. G01B 5/26; G01C 7/04; G01C 19/00; G01C 22/00; G01C 23/01
(52) U.S. Cl. .............................. 33/320; 33/124; 33/521; 33/781; 702/167
(58) Field of Search .................... 33/320, 521, 523, 33/1 H, 343, 121–124, 772–775, 624, 551, 553, 554, 779–782; 73/105, 178 R, 146, 156, 165, 167

(56) References Cited

U.S. PATENT DOCUMENTS

| | | | | |
|---|---|---|---|---|
| 275,734 | A | 4/1883 | Von Reitzner | 33/779 |
| 530,686 | A * | 12/1894 | Gray | 33/779 |
| 2,772,832 | A * | 12/1956 | Lassiter | 33/779 |
| 3,026,164 | A * | 3/1962 | Lancerini | 33/775 |
| 3,604,119 | A * | 9/1971 | Inoue | 33/773 |
| 3,840,726 | A * | 10/1974 | Harrison | 73/178 R |
| 3,858,328 | A * | 1/1975 | Rose | 33/319 |
| 4,144,576 | A * | 3/1979 | Mutton et al. | 33/123 |
| 4,173,073 | A * | 11/1979 | Fukazawa et al. | 33/1 Q |
| 4,321,678 | A * | 3/1982 | Krogmann | 33/320 |
| 4,409,663 | A | 10/1983 | Becker et al. | 702/165 |
| 4,743,913 | A * | 5/1988 | Takai | 33/356 |
| 4,800,501 | A * | 1/1989 | Kinsky | 33/320 |
| 4,814,989 | A * | 3/1989 | Dobereiner et al. | 73/178 R |
| 4,833,787 | A * | 5/1989 | Steenwyk | 33/302 |
| 4,890,233 | A * | 12/1989 | Ando et al. | 33/320 |
| 4,986,121 | A * | 1/1991 | Luscombe | 73/178 R |
| 5,174,038 | A | 12/1992 | Neyens et al. | 33/521 |
| 5,317,515 | A * | 5/1994 | Matsuzaki | 701/221 |
| 5,339,684 | A * | 8/1994 | Jircitano et al. | 73/178 R |
| 5,440,484 | A * | 8/1995 | Kao | 33/356 |
| 5,440,923 | A * | 8/1995 | Arnberg et al. | 73/146 |
| 5,517,419 | A | 5/1996 | Lanckton et al. | 701/216 |
| 5,557,397 | A | 9/1996 | Hyde et al. | 356/5.01 |
| 5,956,660 | A | 9/1999 | Neumann | 702/150 |
| 5,999,878 | A | 12/1999 | Hanson et al. | 701/208 |
| 6,454,036 | B1 * | 9/2002 | Airey et al. | 180/167 |
| 6,529,827 | B1 * | 3/2003 | Beason et al. | 73/178 R |
| 6,532,672 | B1 * | 3/2003 | Gottlieb | 33/124 |

FOREIGN PATENT DOCUMENTS

| | | | |
|---|---|---|---|
| DE | 2922411 | * 12/1980 | 33/320 |
| DE | 3925133 C1 | 12/1990 | |
| DE | 4036424 A1 | 5/1991 | |

(List continued on next page.)

OTHER PUBLICATIONS

Derwent Abstract 1997–342197, Abstract of CA 2160297A, published Apr. 1997.*

Primary Examiner—Diego Gutierrez
Assistant Examiner—Stanley J. Pruchnic, Jr.
(74) Attorney, Agent, or Firm—Mintz, Levin, Cohn, Ferris, Glovsky and Popeo P.C.; Ivor R. Elrifi; Gregory J. Sieczkiewicz (57) ABSTRACT

The disclosed invention is an improvement on the traditional Measuring Wheel. When the odometry information is combined with two direction sensors and an on-board computer, the instrument is able to perform useful measurements to allow the calculation of an area or the description of a non-linear contour, as well as the traditional distance measurements.

31 Claims, 12 Drawing Sheets

FOREIGN PATENT DOCUMENTS

| | | | | |
|---|---|---|---|---|
| DE | 4115809 A1 | 11/1992 | | |
| DE | 19729355 A1 | 1/1999 | | |
| JP | 61-112918 | * | 5/1986 | ................ 33/521 |
| JP | 61-159105 | * | 7/1986 | ................ 33/521 |
| JP | 3-90808 | * | 4/1991 | ................ 33/521 |
| JP | 3-90809 | * | 4/1991 | ................ 33/521 |
| JP | 3-138520 | * | 6/1991 | ................ 33/320 |
| WO | WO 9627779 | | 9/1996 | |

* cited by examiner

| Time | Distance Traveled | Magnetic Vector | | | Specific Force Vector | | | Gyroscope Readings | | |
|---|---|---|---|---|---|---|---|---|---|---|
| 0.00 | 0.00 | 0.62 | 0.41 | 0.67 | 0.18 | 0.08 | 0.98 | 0.08 | 0.08 | 0.03 |
| 0.50 | 1.25 | 0.62 | 0.41 | 0.67 | 0.18 | 0.09 | 0.98 | 0.08 | 0.09 | 0.02 |
| 1.00 | 2.50 | 0.62 | 0.42 | 0.67 | 0.18 | 0.09 | 0.98 | 0.08 | 0.09 | 0.03 |
| ... | ... | ... | ... | ... | ... | ... | ... | ... | ... | ... |
| 133.00 | 165.75 | 0.33 | 0.67 | 0.67 | 0.11 | 0.17 | 0.98 | 0.01 | 0.07 | 0.02 |
| 133.50 | 166.50 | 0.46 | 0.59 | 0.67 | 0.14 | 0.14 | 0.98 | 0.04 | 0.04 | 0.02 |
| 134.00 | 167.25 | 0.56 | 0.48 | 0.67 | 0.11 | 0.11 | 0.98 | 0.01 | 0.01 | 0.02 |

| Time | North Vector | | | East Vector | | | Gravity Vector | | |
|---|---|---|---|---|---|---|---|---|---|
| 0.00 | 0.83 | 0.55 | 0.06 | 0.54 | -.82 | 0.09 | 0.08 | 0.10 | 0.98 |
| 0.50 | 0.83 | 0.55 | 0.06 | 0.53 | -.83 | 0.08 | 0.08 | 0.09 | 0.98 |
| 1.00 | 0.84 | 0.54 | 0.03 | 0.53 | -.83 | 0.08 | 0.08 | 0.09 | 0.98 |
| ... | ... | ... | ... | ... | ... | ... | ... | ... | ... |
| 133.00 | 0.45 | 0.90 | 0.09 | 0.88 | -.44 | -.02 | 0.80 | 0.07 | 0.99 |
| 133.50 | 0.45 | 0.90 | 0.10 | 0.88 | -.43 | 0.00 | 0.90 | 0.04 | 0.98 |
| 134.00 | 0.44 | 0.90 | 0.11 | 0.89 | -.43 | -.01 | 0.10 | 0.01 | 0.97 |

| Time | Position Vector | | | Heading Vector | | |
|---|---|---|---|---|---|---|
| 0.00 | 0.00 | 0.00 | 0.00 | 0.83 | 0.55 | 0.06 |
| 0.50 | 1.04 | 0.69 | 0.75 | 0.83 | 0.55 | 0.06 |
| 1.00 | 2.09 | 1.37 | 1.51 | 0.84 | 0.54 | 0.03 |
| ... | ... | ... | ... | ... | ... | ... |
| 133.00 | -0.36 | -1.75 | 0.00 | 0.45 | 0.90 | 0.09 |
| 133.50 | 0.09 | -0.85 | 0.10 | 0.45 | 0.90 | 0.10 |
| 134.00 | 0.54 | 0.05 | 0.20 | 0.44 | 0.90 | 0.11 |

CONTOUR MEASURING DEVICE AND METHOD

RELATED INVENTION

This application is a continuation-in-part of U.S. Ser. No. 09/767,410, filed Jan. 19, 2001, now U.S. Pat. No. 6,550,151 which is incorporated herein by reference in its entirety.

BACKGROUND OF THE INVENTION

1. Field of the Present Invention

The present invention generally pertains to devices and methods for measuring the geometric characteristics of terrain. More specifically, the present invention uses a wheeled instrument with a sensor array to trace the profile of a land surface.

2. Description of the Related Art

The manually operated Measuring Wheel is a classic tool of the surveyor's art and is often used in conjunction with other measuring instruments to produce a geometric representation of the terrain. The use of this device is generally a time consuming and expensive process which requires a highly trained individual.

Typically, this instrument is a pole with an affixed handle at one end and a supporting wheel at the other. The supporting wheel is equipped with an odometer that is either mechanical (U.S. Pat. No. 275,734) or electronic (U.S. Pat. No. 4,409,663).

Methods have been developed for automatic surveying of very large plots of land using motorized land vehicles, such as disclosed in U.S. Pat. No. 5,174,038, or aircraft, such as disclosed in U.S. Pat. No. 5,557,397, which naturally require very expensive equipment and highly skilled operators. Such large-scale systems may depend on satellites; say via GPS or DGPS (U.S. Pat. No. 5,999,878) or photogrametry (U.S. Pat. No. 5,517,419).

Small scale automated surveying systems, such as disclosed in U.S. Pat. No. 5,956,660 or German patent DE 19729355 (based on inertial dead reckoning) are subject to error accumulation, and so have limited practical value.

A useful addition to the Measuring Wheel would be the ability to make and keep a digital record of its track. A precise track would allow the Measuring Wheel to function as a stand-alone surveying device. Several attempts have been made in this direction:

German patent DE4036424 discloses a three-wheeled device designed for flat terrain. The device contains two coaxial measuring wheels, which is sufficient to determine the contour of travel in the plane of motion of the device, subject to the usual error accumulation problem. Since any discrepancy between the odometry of the two wheels is interpreted as a change in orientation, the operator will be required to take care that neither wheel slips during turns, which will make the device considerably more difficult to use than a standard Measuring Wheel. A related patent, DE4115809, teaches that, with the addition of an inclinometer along its forward axis, that device would have the capability to measure changes in elevation as well, but this will only be accurate if the device moves directly up or down hill.

Another attempt to measure contours is disclosed in German patent DE3925133, which, instead of a wheel, uses a ball that is able to roll in any direction on the surface to be surveyed. During its motion, this ball must maintain physical contact with the balls of two computer mice that are affixed to the housing of the device. When this device is used outdoors dirt and moisture come in contact with the rolling ball and are transferred to the bearings and the mice. In a clean environment, the device will be affected by the usual error accumulation. Also, the operator is responsible for maintaining the housing at a level attitude while surveying.

World patent application WO9627779 discloses a method of profiling terrain with a device supported by at least one wheel equipped with an odometer, together with orientation sensors to determine the direction of the measurement wheel. For devices with a single supporting wheel, the track of a wheel on a surface depends on both the attitude of the wheel and the attitude of the surface. Even if the attitude of a wheel is sensed perfectly, without a method to determine the attitude of the surface on which it rests, an accurate track cannot be made. Distortion will be introduced in the track even when surveying terrain that is known a priori to be flat. Of the particular embodiments disclosed in this patent only the device disclosed in claim 17, in which the wheel is rigidly connected to two other supporting wheels, is not vulnerable to surface attitude distortion. This three wheeled device, however, lacks the freedom of movement of the traditional Measuring Wheel, making it awkward to use in an outdoor environment, and prone to inaccuracies resulting from the tendency of one or more of the of support wheels to lose contact with the surface over uneven terrain.

Accordingly, it is desirable to accurately track two- or three-dimensional contours with a device having fewer than three supporting wheels in which the guide-pole is able to tip from side to side as well as forwards and backwards, like a traditional Measuring Wheel.

SUMMARY OF THE INVENTION

The invention pertains to a device and method for accurately measuring geometrical features of terrain using a measurement wheel, orientation and heading sensors, and a computing device. The present invention enables the description of a two or three-dimensional landscape.

Accordingly, in one aspect of the present invention, a measurement device includes a wheel that is propelled by the operator using a guide-pole and handle, a sensor compartment rigidly mounted to the device, a digital odometry sensor (e.g., a digital odometer that measures the distance traveled by the wheel). Since the device is supported by one wheel only, the operator of this device has the same freedom of movement as has the operator of a classic Measuring Wheel.

The above aspect may also include a detachable computer with input and output peripherals, as well as a a sensor array for detecting the attitude of the wheel in space, or on a surface. Specifically, the attitude can be sensed by any method that yields a log of data from which the pitch, roll and yaw of the device may be recovered with respect to a fixed coordinate system. Accordingly, in the present invention the fixed coordinate system may be defined with respect to the earth or other convenient reference frame.

The present invention also provides for the extraction of a heading vector. The heading may be determined by any method that yields, from among the vectors in the plane of the measurement wheel, the vector which points in the direction of the instantaneous motion of the device.

The operator guides the measuring device over the terrain along the contour to be measured. The output of the digital odometer and other sensors are periodically recorded and combined in a sensor log, which is digitally stored on the hand-held computer. Since the attitude and heading of the measurement wheel are encoded in the sensor log, the data collected from the sensors may be processed, either in real time or later, and combined with the odometry to yield a discrete record of the track of the device, that is, of the locations through which the instrument has traveled relative to a fixed coordinate system.

In one embodiment, the sensor array comprises three sensors, said sensors being selected from the group consisting of accelerometers, inclinometers and magnetometers, or a combination thereof. In other embodiments, the sensor array is selected from the group consisting of two magnetometers and two accelerometers; two magnetometers and two inclinometer; two magnetometer and two gyroscopes; two accelerometer and two gyroscopes; and two inclinometers and two gyroscope.

Applications of such a device include, but are not limited to:

a. measuring the distance traveled by the Measuring Wheel. This is the same information available with the current generation of Measuring Wheels.
b. measuring the straight-line distance between two points when there are intervening obstacles. Ponds, fences, trees, houses, debris, etc. can be avoided and the device will still measure an accurate straight-line distance between two points.
c. measuring surface area. The digitization of the contour makes an estimate of the included surface area possible. This is especially useful for measuring irregular contours. For example, the device could measure the area of a curving driveway and effectively estimate the amount of asphalt needed to cover the surface.
d. measuring acreage. Since acreage of a region is computed from a two dimensional vertical projection, this device can accurately compute the acreage included in a contour, having applications in land development and management.
e. accident and crime scene reconstruction. The device can trace non-linear contours, e.g. tire marks on the road following an automobile accident, in much greater detail than existing Measuring Wheels. This facilitates a more accurate reconstruction of the event.

For a better understanding of the invention, reference is made to the below referenced drawings and written description following immediately hereafter.

BRIEF DESCRIPTION OF THE DRAWINGS

Other objects, features and advantages will occur to those skilled in the art from the following description of the preferred embodiments, and the accompanying drawings, in which.

DETAILED DESCRIPTION OF THE INVENTION

First Embodiment

Figure 1:
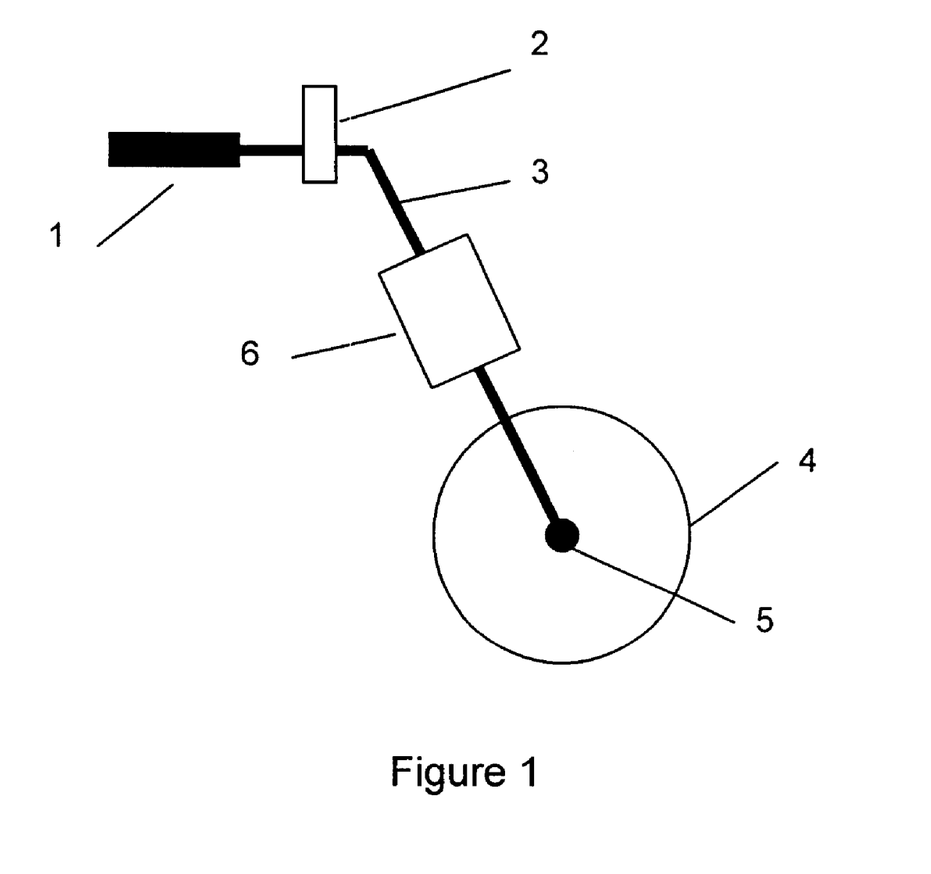
FIG. 1 illustrates a measuring wheel according to one embodiment of the present invention.

The first preferred embodiment of the present invention is shown in FIG. 1. A measurement wheel 4 is equipped with a digital odometer 5 and affixed to a guide-pole 3. A sensor compartment 6 is mounted on the guide-pole 3 and cables run from the sensors along the guide-pole 3 to the detachable portable computer 2 mounted in a cradle on the handle 1. The digital odometer 5 can use optical or Hall-Effect technology and measures the rotation of the measurement wheel. Alternatively, the digital odometer may utilize optical tracking of the terrain to be surveyed.

The attitude of the measurement wheel 4 is measured in two ways.

A three-axis gyroscope sensor array measures the angular change of the device with respect to the coordinate axes of the sensor compartment. That is, three gyroscopes are positioned at orthogonal angles to provide a three dimensional vector that gives the direction and magnitude of the angular velocity of the device. Given the initial attitude of the device, the output of the gyroscopes may be integrated to determine the attitude of the device at any subsequent time.

A three-axis magnetometer sensor array measures the direction and magnitude of the Earth's magnetic field, $\vec{M}$, in the first preferred embodiment of the device. That is, three magnetometers are positioned at orthogonal angles to provide a three dimensional vector that gives the direction and magnitude of the naturally occurring magnetic field. A three-axis accelerometer sensor array measures the direction and magnitude of the specific force, $f_S^z$, on the device. The specific force is $f_S^z = \vec{a} - \vec{g}$, where $\vec{a}$ is the acceleration with respect to a fixed inertial reference system and $\vec{g}$ is the acceleration due to the force of gravity. The acceleration sensor is constructed from three single-axis accelerometers positioned at orthogonal angles.

If there is no acceleration on the device, for instance at the initial state when the device is at rest, the specific force equals the gravity vector. In this case the coordinates of $\vec{M}$ and $\vec{g}$ are both known in the instrument coordinate system 11. Using these vectors, device coordinates of the unit vectors $\vec{N}$, $\vec{E}$ and $\vec{G}$, pointing nominally North, East and toward the center of the earth, can be computed. This orthonormal triad comprises the entries of the matrix that may be used to transform device to world coordinates and vice versa.

$$M = \begin{bmatrix} [N] \\ [E] \\ [G] \end{bmatrix} = [[W_1][R][W_2]]$$

The instrument coordinate system 11 consists of three unit vectors $\vec{W_1}$, $\vec{W_2}$ and $\vec{R}$. The orthogonal unit vectors $\vec{W_1}$ and $\vec{W_2}$ are fixed with respect to the sensor compartment 6 and lie arbitrarily in the plane of the measurement wheel. The unit vector $\vec{R}$ points in the direction of the axis of the measurement wheel 4 and to the right of the device when viewed from behind. The vector $\vec{R}$ is also fixed with respect to the sensor compartment. Note that it is not necessary for the proper functioning of the device for $\vec{R}$ to point along the surface. Ergonomically, this means that the device can tilt and roll without impacting the accuracy of the measurements. The unit vector $\vec{F}$ 15, indicating the direction of forward travel of the instrument, lies in the plane of the wheel when the device is rolling, and is expressible in terms of $\vec{W_1}$ and $\vec{W_2}$.

If the device is undergoing an acceleration, then the acceleration during the (n+1) time interval, $\vec{a}(n+1)$, can be computed from the previous entries in the sensor and tracking logs via $$\vec{a}(n+1) = \frac{\Delta s(n+1)\vec{F}(n) - 2\vec{P}(n) + \vec{P}(n-1)}{\Delta t^2}$$

in which $\Delta s$ is the distance traveled measured by the odometer, $\vec{P}$ is the position of the wheel, $\Delta t$ is the elapsed time, and $\vec{F}$ is the heading vector, with all vectors relative to the instrument coordinates 11 at time n.

The measurement of $\vec{a}$ is combined with the specific force reading of the accelerometers to produce a gravity vector $\vec{g} = \vec{a} - \vec{f_s}$ with respect to device coordinates, and filtered with the determination of $\vec{g}$ by the gyroscopes.

These two attitude measurements, one subject to gyroscopic drift and the other to periodic error accumulation, are combined with a Kalman filter to yield an accurate and reliable measurement of the attitude of the device.

Since attitude sensors mounted on a device with one supporting wheel are insufficient to allow the recovery of the heading vector 15 from the sensor log, the method requires additional measures to determine the heading.

The heading vector is also determined in either of two ways.

The three single axis accelerometers mounted in the sensor compartment give the specific force vector $\vec{f_s} = \vec{a} - \vec{g}$, where $\vec{a}$ is the acceleration on the device and $\vec{g}$ is the acceleration of gravity. Since $\vec{g}$ is known from the attitude of the device, it is possible to integrate $\vec{a} = \vec{f_s} + \vec{g}$ to get the velocity vector, which points in the direction of the heading if the device is in rolling motion.

When the attitude of the surface to be profiled is known or assumed, then the heading may be inferred from $\vec{H} = \vec{R} \times \vec{DN}$, where $\vec{H}$ is the heading vector, $\vec{R}$ is the right vector along the axel of the measurement wheel, $\vec{DN}$ is normal to the surface, and x is the vector cross product.

Second Embodiment

Figure 2:
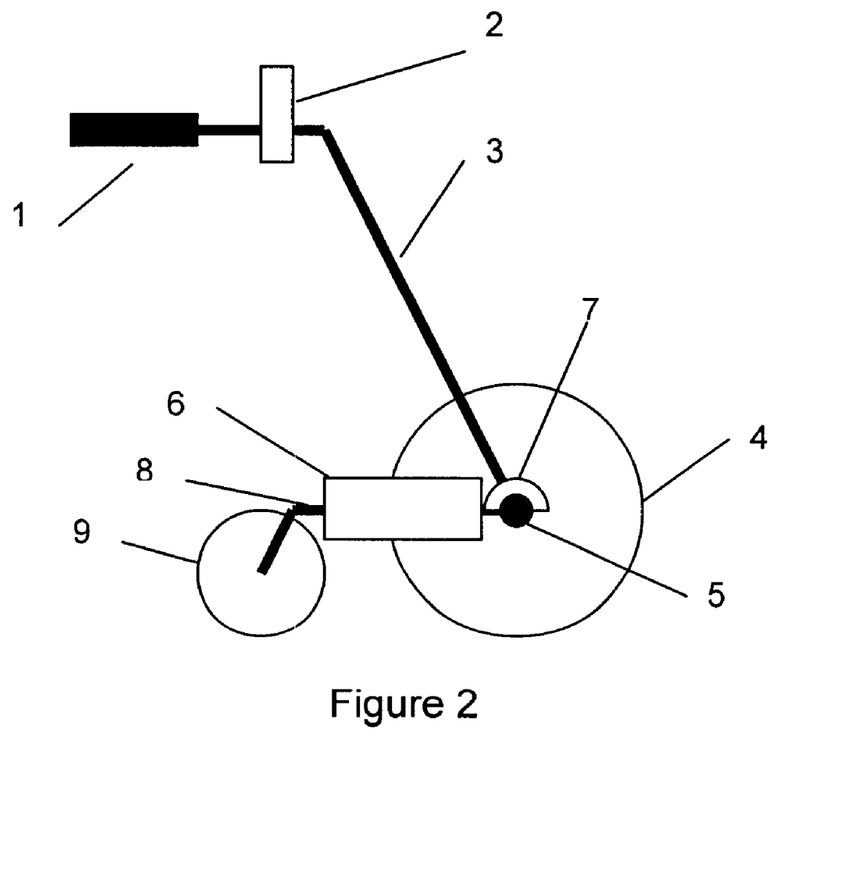
FIG. 2 illustrates a measuring wheel according to another emodiment of the present invention which includes a trailing member.

FIG. 2 illustrates the second preferred embodiment of the device in which a trailing member 8 is attached to the measurement wheel 4 such that the point of contact of the trailing member with the surface to be profiled is in the plane of the wheel. In this embodiment the heading vector 15 is fixed with respect to the sensor compartment 6 which is rigidly mounted to the axle of the measurement wheel and along the trailing member.

A spring 7 applies force to the trailing member to insure that it keeps contact with the ground, as well as to dampen vibrations.

This embodiment is capable of improved accuracy since the heading vector can be found from the attitude sensors alone, with only a slight cost in ergonomics. The heading computed from the method disclosed in the first preferred embodiment may be compared for additional error correction.

Both preferred embodiments of the present invention disclose a method to profile terrain with a measurement device supported by a single wheel.

Figure 5:
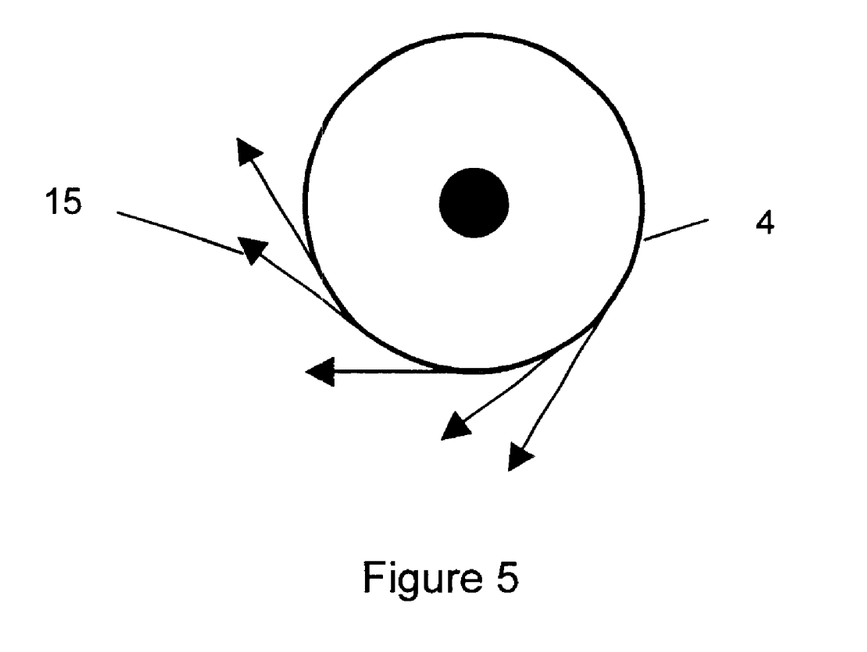
FIG. 5 is a close up view of the wheel with different possible heading vectors indicated.

A limitation of one-wheeled devices is that no local information about the surface is implied by the attitude of the wheel, since there is, ideally, just one point of contact between the wheel and the surface. Depending on the attitude of the surface at the point of contact, the heading vector 15 may be any vector in the plane of the wheel, see FIG. 5. If the wheel is erect, so that the vector $\vec{R}$ is horizontal, then the heading vector $\vec{F}$ determines the angle of inclination of the track. If the wheel is not erect, then uncertainty in the heading vector will effect both the inclination and azimuth of the track.

Figure 6:
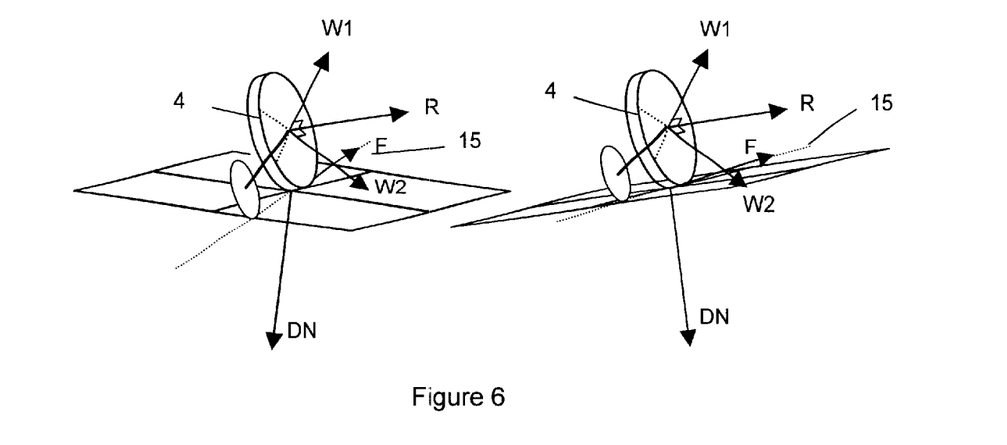
FIG. 6 is an illustration of how the attitude of the wheel is insufficient to determine the heading vector.
Figure 7:
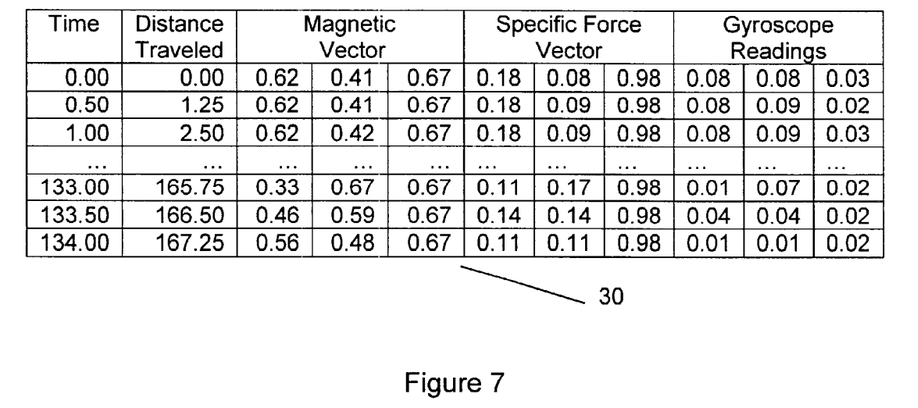
FIG. 7 illustrates an example of a sensor log used to recreate the contour and, if relevant, the surface of a measured contour.
Figure 8:
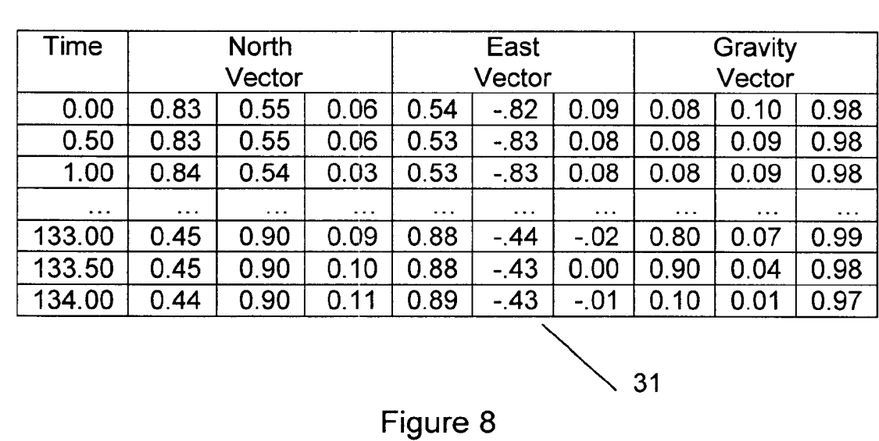
FIG. 8 illustrates an example of a derived attitude log.
Figure 9:
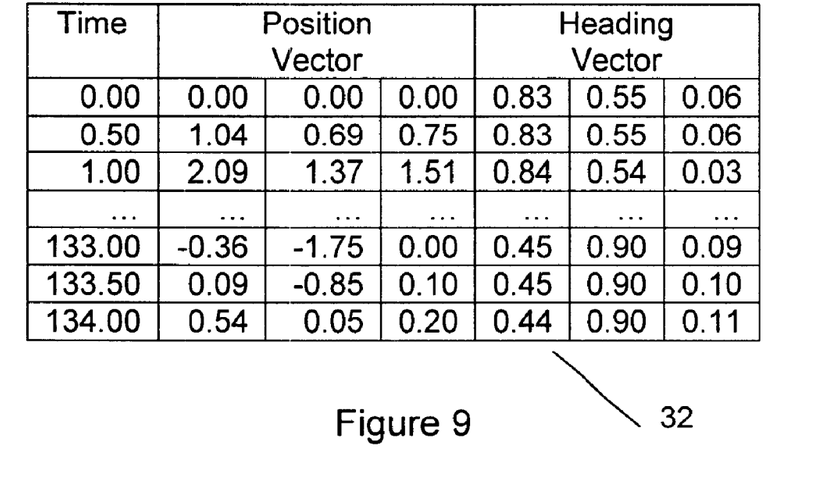
FIG. 9 illustrates an example of a tracking log.
Figure 10:
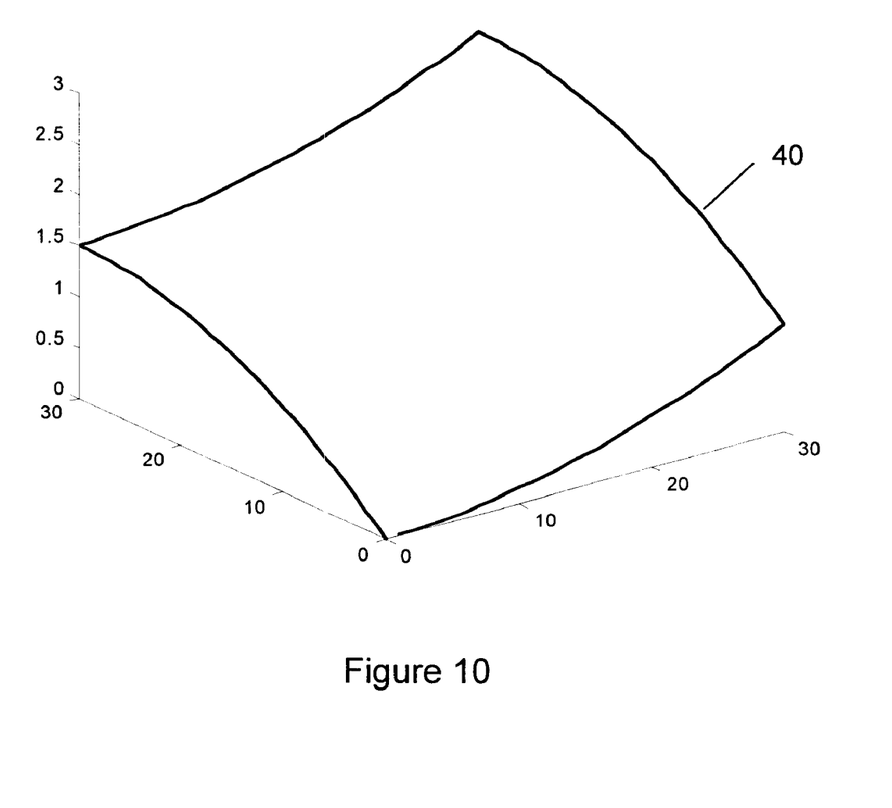
FIG. 10 illustrates an example of a contour plotted from a tracking log.

FIG. 6 is an illustration of two situations in which measurement wheels 4 with identical attitudes 11 are in contact with surfaces with different local attitudes 12 at the point of contact with the wheel, giving rise to heading vectors 15 which differ in both inclination and azimuth. It also shows how the profiling wheel 9, coplanar with the measurement wheel 4, detects the change in attitude sufficiently to determine the heading vector.

The surface profiling method, therefore, proceeds in four stages; determination of the attitude of the device, determination of the heading of the device, integration of the heading and odometry to produce a contour, and contour storage and post-processing.

To conform to the method the heading may be determined using inertial sensors, as detailed in the first preferred embodiment.

If the attitude $\vec{DN}$ 12 of the surface to be surveyed is known, either by optical or other sensors, or by a priori knowledge or user input, for instance if the surface is assumed to be flat and level, then the heading 15 can be determined mathematically from the vector $\vec{R} \times \vec{DN}$.

Figure 3:
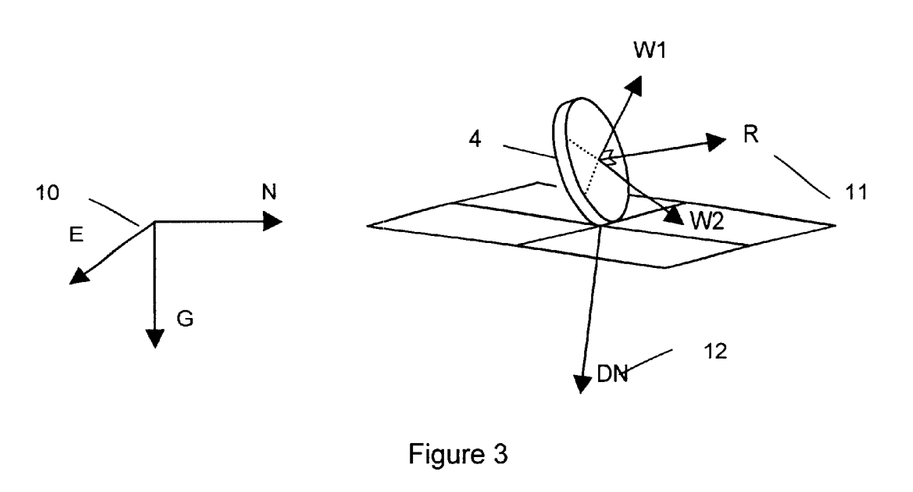
FIG. 3 shows the relationship of field vectors to navigation vectors for the invention.
Figure 4:
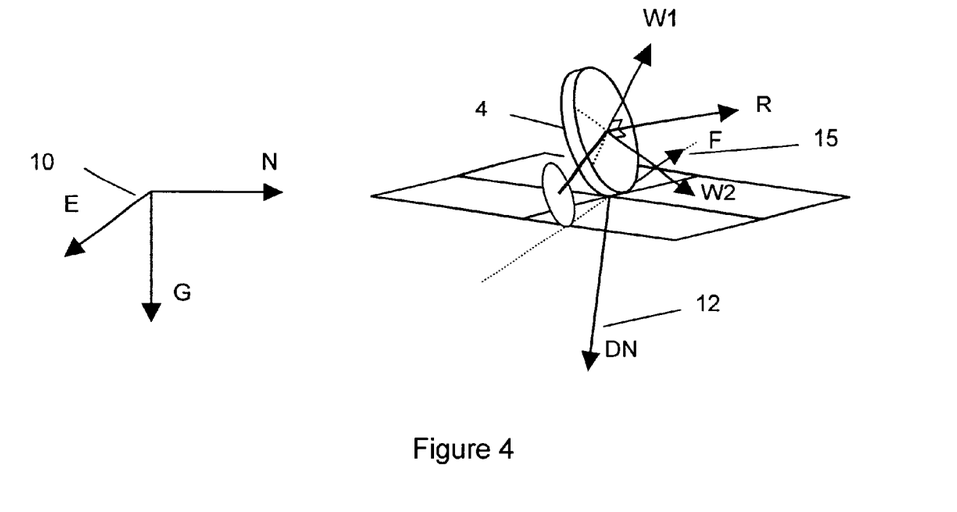
FIG. 4 shows field vectors and its relation to a heading vector for the embodiment of the invention utilizing the trailing member.

Specifically, if $\vec{R}$ is the vector pointing perpendicular to the plane of the wheel along the axle, and $\vec{DN}$ 12 is the (downward pointing) normal to the tangent plane of the surface at the point of contact, see FIG. 3, then, since the wheel must roll in a direction perpendicular to both the axle and $\vec{DN}$, the heading of the wheel 15 will be in the direction of $\vec{R} \times \vec{DN}$, their vector cross product, see FIG. 4.

The heading may also be determined mechanically, for instance by a leading or trailing member, as detailed in the second preferred embodiment.

The operator activates the measuring wheel at the start of the operation with the device at rest and placed at the initial point of the contour to be measured. The operator pushes the device along the contour, which may typically be the perimeter of a patch of land to be surveyed. There are no restrictions on how the instrument is pushed along the ground related to the pitch or roll of the device as long as the wheel rolls without slipping or sliding. Any angle that is comfortable to the operator will work. Of course, the measurement wheel of the device needs to be kept in contact with the ground, just like with the traditional Measuring Wheel.

While measuring, the instrument collects the sensory information at regular intervals, and stores this data in a sensor log 30. The sensor log contains: the distance traveled since the last sample, the three components of the magnetic vector, the three components of the specific force vector, and the readings from the three gyroscopes. The stored information in the sensor log, together with the initial conditions, is sufficient to construct a log 31 of the attitude of the device, from which a log 32 of the heading and position can be constructed and plotted to form a two dimensional map 40 of the traversed contours.

Figure 11:
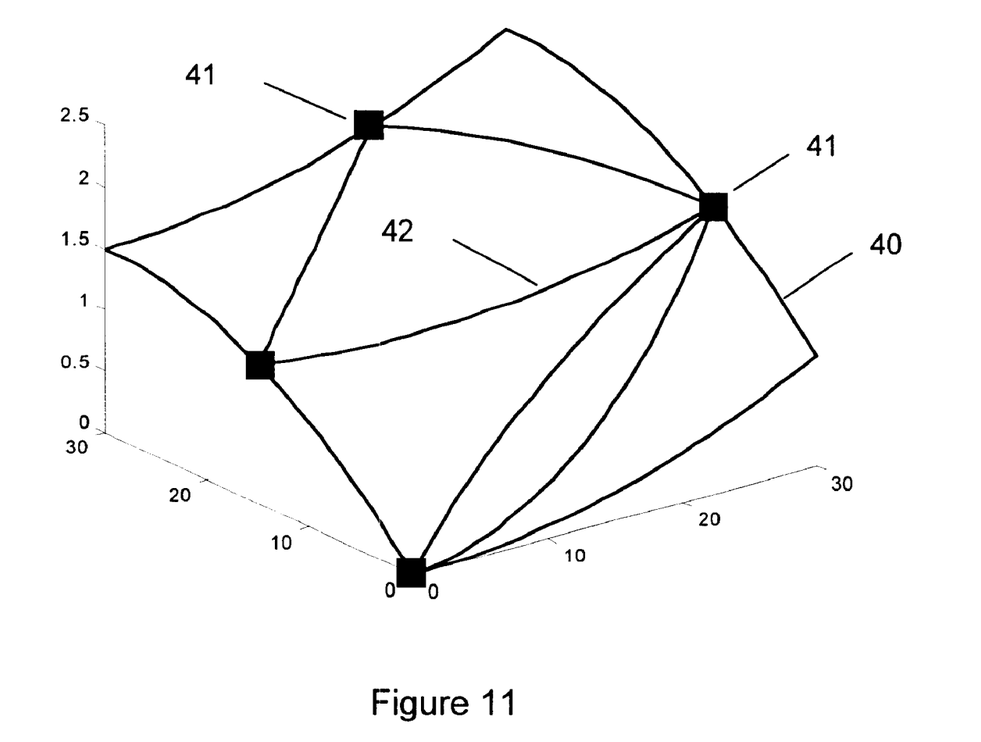
FIG. 11 illustrates an example of a contour with interior paths comprising a three dimensional representation of the terrain.
Figure 12:
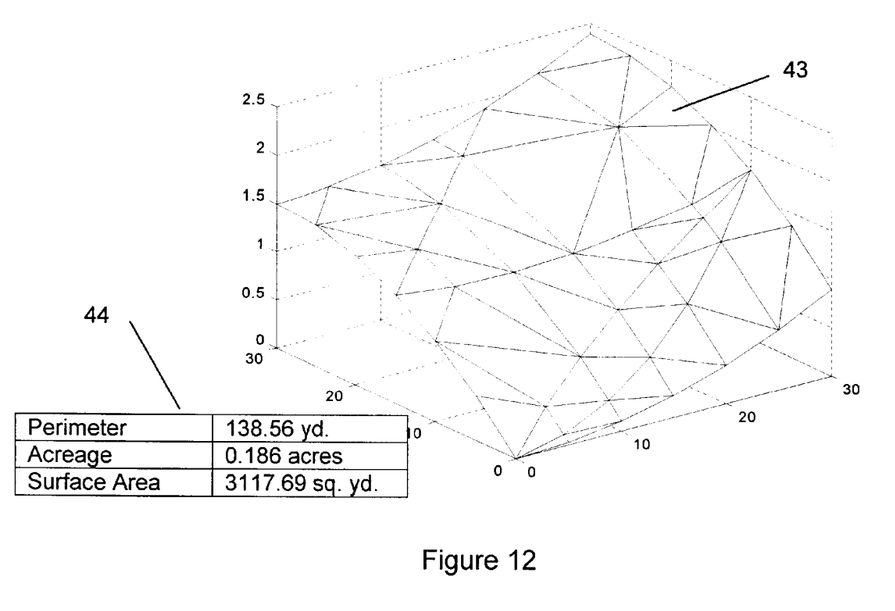
FIG. 12 illustrates a triangulated reconstruction of a surveyed terrain together with computed indices 44.

At any time during operation a marker 41 may be placed on the ground and, simultaneously, a notation is made in the sensor log. Later, the operator may return with the device and continue surveying at the marked position. In this manner contours with branch points may be surveyed as well as interior segments 42 of perimeters, thereby increasing the accuracy of surface area calculations, if necessary. With a sufficient number of interior contours, a survey of the interior 43 of the perimeter may be effected.

Having thus presented the present invention in view of the above described embodiments, various alterations, modifications and improvements will readily occur to those skilled in the art. Such alterations, modifications and improvements are intended to be within the scope and spirit of the invention. Accordingly, the foregoing description is by way of example only and is not intended to be limiting. The invention's limit is defined only in the following claims and the equivalents thereto.

What is claimed is:

1. A measuring device for measuring contours to scale for the description of a landscape, the device comprising:
    a measurement wheel, wherein said measurement wheel consists of a single measurement wheel;
    a sensor array, wherein said sensor array is selected from the group consisting of two magnetometers and two accelerometers; two magnetometers and two inclinometers; two magnetometers and two gyroscopes; two accelerometers and two gyroscopes; and two inclinometers and two gyroscopes;
    a digital odometer, wherein said digital odometer is operably connected to said single measurement wheel; and
    a guide, wherein said guide is operably connected to said single measurement wheel and said sensor array,
    wherein said measuring device contacts said landscape only at said single measurement wheel.

2. The device of claim 1, wherein said sensor array is affixed to said guide.

3. The device of claim 1, wherein said sensor array comprises three accelerometers and three gyroscopes, wherein a sensitive axis of each accelerometer and each gyroscope is positioned at a known geometry.

4. The device of claim 1, wherein said sensor array is selected from the group consisting of:
    an accelerometer array comprising two or more individual accelerometers at right angles to each other, and a magnetometer array comprising two or more individual magnetometers at right angles to each other;
    an inclinometer array comprising two or more individual inclinometers at right angles to each other, and a magnetometer array comprising two or more individual magnetometers at right angles to each other;
    a gyroscope array comprising three gyroscopes at right angles to each other, and a magnetometer array comprising two or more individual magnetometers at right angles to each other;
    a gyroscope array comprising three gyroscopes at right angles to each other, and an accelerometer array comprising two or more individual accelerometers at right angles to each other; and
    a gyroscope array comprising three gyroscopes at right angles to each other and an inclinometer array comprising two or more individual inclinometers at right angles to each other.

5. The device of claim 1, further comprising a detachable computer having an input and an output.

6. The device of claim 5, wherein locations intermediate to a start and a finish of a description of said contour to be measured may be stored in a memory of said computer and integrated into a map.

7. The device of claim 1, wherein the digital odometer is an optical shaft encoder.

8. The device of claim 1, wherein the digital odometer is an optical sensor capable of acquiring sequential surface images and mathematically determining the direction and magnitude of movement.

9. A method for measuring contours to scale for the description of a landscape, the method comprising:
    providing the measuring device of claim 1;
    guiding said measuring device over a landscape;
    collecting sensory information data from said sensor array and said digital odometer;
    storing said sensory information in a said-sensor log; and
    transforming said stored information to form a discrete record of the locations through which said device has traveled,
    thereby measuring contours to scale for the description of a landscape.

10. The method of claim 9, further comprising truing a heading of said device using an attitude of said measuring device.

11. The method of claim 10, wherein said heading is defined by the relationship between said attitude of said guide and a direction of a gravitational field.

12. The method of claim 11, wherein said sensor array comprises three accelerometers, wherein a first measurement of gravitational field is isolated from a second measurement of acceleration due to a change in inertial reference systems.

13. The method of claim 10, wherein said heading is defined by a relationship between said attitude of said guide and an attitude of said contour.

14. The method of claim 10, wherein said heading is defined by an attitude of a member attached to said guide that is kept at a known angle to said contour.

15. The method of claim 14, wherein said attitude of the member is defined relative to an arbitrary inertial reference system.

16. The method of claim 14, wherein the attitude of the member relative to a fixed reference system is defined by two or more members of a group consisting of a gravitational field, a magnetic field and an arbitrary inertial reference system.

17. The method of claim 10, wherein said attitude of said device is defined relative to a magnetic field.

18. The method of claim 10, wherein said attitude of said device is defined relative to a gravitational field.

19. The method of claim 9, wherein a heading of said measuring device is defined by an inertial guidance sensor.

20. The method of claim 19, wherein said heading is trued by integrating and filtering data from said sensor array.

21. The method of claim 9, wherein a distance traveled is measured by optically acquiring sequential surface images and mathematically determining the direction and magnitude of movement.

22. The method of claim 9, wherein distance is measured independently of data from said sensor array.

23. The method of claim 9, wherein locations intermediate to a start and a finish of a description of said contour are stored and integrated into a digital map.

24. The method of claim 9, further comprising generating a contour map based upon a series of discrete measurements.

25. The method of claim 24, wherein said contour map is generated for measurements of a predetermined area.

26. The method of claim 24, wherein said contour map is generated to analyze vehicular accidents.

27. The method of claim 9, wherein a change to said contour resulting from a geological event is measured.

28. A measuring device for measuring contours to scale for the description of a landscape, the device comprising:

- a measurement wheel, wherein said measurement wheel consists of a single measurement wheel;
- a sensor array, wherein said sensor array is selected from the group consisting of two magnetometers and two accelerometers; two magnetometers and two inclinometers; two magnetometers and two gyroscopes; two accelerometers and two gyroscopes; and two inclinometers and two gyroscopes;
- a digital odometer, wherein said digital odometer is operably connected to said single measurement wheel; and
- a guide, wherein said guide is operably connected to said single measurement wheel and said sensor array.
- further comprising a leading member and a loading device, wherein said leading member is operably connected to and positioned in a plane of said single measuring wheel, and wherein said loading device insures said leading member is positioned in contact with said contour, wherein said measuring device contacts said landscape only at said single measurement wheel and said leading member.

29. A measuring device for measuring contours to scale for the description of a landscape, the device comprising:

- a measurement wheel, wherein said measurement wheel consists of a single measurement wheel;
- a sensor array, wherein said sensor array is selected from the group consisting of two magnetometers and two accelerometers; two magnetometers and two inclinometers; two magnetometers and two gyroscopes; two accelerometers and two gyroscopes; and two inclinometers and two gyroscopes;
- a digital odometer, wherein said digital odometer is operably connected to said single measurement wheel; and
- a guide, wherein said guide is operably connected to said single measurement wheel and said sensor array.
- further comprising a trailing member and a loading device, wherein said trailing member is operably connected to and positioned in a plane of said single measuring wheel, and wherein said loading device insures said trailing member is positioned in contact with said contour, wherein said measuring device contacts said landscape only at said single measurement wheel and said trailing member.

30. A measuring device for measuring contours to scale for the description of a landscape, the device comprising:

- a measurement wheel;
- a sensor array, wherein said sensor array comprises three sensors, said sensors being selected from the group consisting of accelerometers, inclinometers and magnetometers, or a combination thereof;
- a digital odometer, wherein said digital odometer is operably connected to said measurement wheel;
- a guide, wherein said guide is operably connected to said measurement wheel and said sensor array, and
- a computer having a sensor log wherein said computer is operably connected to said guide.

31. The device of claim 30, wherein sensitive axes of each sensor are positioned at a known geometry relative to one another.

* * * * *